(12) United States Patent
Saylor (10) Patent No.: US 10,742,033 B2
(45) Date of Patent: Aug. 11, 2020

(54) MOBILE POWER AND PANEL UNIT

(71) Applicant: Phillip G. Saylor, Indianapolis, IN (US)

(72) Inventor: Phillip G. Saylor, Indianapolis, IN (US)

( * ) Notice: Subject to any disclaimer, the term of this patent is extended or adjusted under 35 U.S.C. 154(b) by 0 days.

(21) Appl. No.: 16/590,438

(22) Filed: Oct. 2, 2019

(65) Prior Publication Data

US 2020/0119551 A1 Apr. 16, 2020

Related U.S. Application Data

(60) Provisional application No. 62/744,185, filed on Oct. 11, 2018.

(51) Int. Cl.
*H02J 3/14* (2006.01)
*H02B 1/52* (2006.01)

(52) U.S. Cl.
CPC . *H02J 3/14* (2013.01); *H02B 1/52* (2013.01)

(58) Field of Classification Search
CPC ....................................................... H02J 3/14
See application file for complete search history.

(56) References Cited

U.S. PATENT DOCUMENTS 5,574,622 A * 11/1996 Brown .................... F02B 63/04
307/150
5,784,249 A * 7/1998 Pouliot ................ H02G 3/0493
174/68.1

OTHER PUBLICATIONS

Wikipedia contributors. "Distribution board." Wikipedia, The Free Encyclopedia. Wikipedia, The Free Encyclopedia, Apr. 28, 2020. Web. May 14, 2020. (Year: 2020).*

* cited by examiner

*Primary Examiner* — Daniel J Cavallari
(74) *Attorney, Agent, or Firm* — Maginot, Moore & Beck, LLP (57) ABSTRACT

A mobile power apparatus provides a temporary interface between an electrical power supply and an existing electrical system or subsystem of a building. One or more electrical panels are supported on a mobile frame that can be transported to and within the building. The electrical panels are configured to emulate the existing building panels, including a plurality of electrical overload components. The electrical panel is connected to a safety switch box mounted to the frame assembly which includes a fuse array and a master on-off switch. The safety switch box includes a power cable bundle configured for electrical connection to an output power cable of the electrical power supply, which can be the building electrical supply, an external power supply or a back-up or emergency generator.

16 Claims, 15 Drawing Sheets

MOBILE POWER AND PANEL UNIT

PRIORITY CLAIM

This application is a utility filing form and claims priority to U.S. Provisional Application No. 62/744,185, filed on Oct. 11, 2018, the entire disclosure of which is incorporated herein by reference.

BACKGROUND

The present disclosure relates to electrical power systems and particularly to a unit for temporarily routing electricity to an existing electrical system. The power distribution system for a typical building distributes electricity from a power utility throughout the building. Typically, the utility power line is connected to a transformer for the building, with the output of the transformer passing through an electrical meter to an electrical distribution panel. The electrical distribution panel then distributes electricity to multiple branch circuits, with each branch circuit including multiple electrical outlets or direct electrical connections to the rooms and devices throughout the building. The electrical distribution panel or load center includes a fuse or a circuit breaker associated with each branch circuit that trips when an over-current or ground fault condition occurs. The discrete circuit breakers allow only the affected branch circuit to be tripped without affecting the other branch circuits. In larger buildings a switch gear is interposed between the utility's transformer and the building circuitry. The switch gear is connected by a bus or feeder to separate transformers and distribution panels for discrete regions of the building. Each distribution panel is then connected to the multiple branch circuits associated with that particular region of the building.

The mobile power panel unit of the present disclosure was born out of a significant need that arose during a flood disaster. In a recent flood, a regional hospital was inundated with flood waters, which in turn interrupted all power to the hospital. Even after the water had substantially receded, emergency generators were unable to supply electrical power throughout the hospital because the hospital electrical system had been compromised. In particular, the electrical distribution boards that fed electricity to subsidiary circuits throughout the hospital were either still underwater or severely damaged by the floodwaters and too risky to energize. Thus, while the subsidiary circuits throughout the building were functional, no electricity could be delivered to those circuits because the electrical distribution panels were compromised. Electrical distribution panels for a building are typically located in the lowest level of the building so that they are easily susceptible to flooding and the delays in clearing the lower levels of water.

In a less dramatic situation, electrical distribution boards and subsidiary circuits in a large building frequently require maintenance or replacement. The maintenance activity requires that the selected portion of the power system be de-energized, which means that the affected area of the building is without electrical power until the maintenance work is complete. In some cases such a procedure is not very problematic because the work can be performed during off hours. However, some buildings, such as hospitals, are active 24 hours a day, seven days a week, so there are no off hours during which the electrical maintenance can be performed.

In both cases there is a need for a temporary unit that can connect an existing electrical system to an alternate source of electrical power.

SUMMARY OF THE DISCLOSURE

A mobile power apparatus is configured to provide emergency or temporary power to an existing building electrical system. The apparatus comprises a frame assembly including a plurality of vertical and horizontal elements connected to form a support structure, and a plurality of wheel assemblies configured for transporting the mobile power apparatus on a floor of the building. At least one electrical panel is mounted to the frame assembly which includes a plurality of electrical overload components, each overload component having an electrical input and an electrical output. An output wire bundle includes a plurality of wires electrically connected to the electrical output of corresponding ones of the plurality of electrical overload component. The wires in the wire bundle are also configured to be electrically connected to corresponding wires in the existing electrical system or subsystem of the building. The apparatus further includes a safety switch box including a fuse array having a plurality of fuses, each of the plurality of fuses electrically connected to the input of a corresponding electrical overload component, and each of the plurality of fuses electrically connected to a power cable configured for electrical connection to an output power cable of the electrical power supply.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

A mobile power apparatus, or mobile power panel (MPP) unit, 10 shown in FIGS. 1-8 can be used to provide a temporary interface between an existing or external electrical power supply and an existing electrical system or subsystem. The unit 10 includes an open frame assembly 12 mounted on a plurality of wheel assemblies 14 that can incorporate lockable caster wheels to permit the unit to be transported on the floors of the building to a specific location as needed. For instance, if a particular electrical panel within a building requires service, the mobile power panel unit 10 can be transported on the wheel assembly to a location immediately adjacent the affected electrical panel. As described in more detail below, the unit 10 can be used to directly bypass the affected electrical panel, allowing maintenance, repair or replacement work to be performed on the panel.

The frame assembly 12 includes four vertical elements 15 and horizontal base elements 17 that are connected in a conventional manner to form a generally rectangular-sided support structure. The assembly 12 further includes horizontal upper elements 18 and horizontal intermediate elements 19 that provide rigidity for the frame assembly as well as mounting locations for the components of the unit. In one embodiment, the frame assembly 12 is sized and configured to support industrial electrical power system components. The frame assembly can thus form a 70×34×25 inch rectangular frame structure. The elements 15, 17, 18, 19 can be stainless steel or aluminum frame beams that are attached to each other using angle brackets and bolt arrangements. The open configuration of the frame assembly 12 provides large open space for heat diffusion as well as ready access to the wiring carried by the MPP unit 10.

Figure 1:
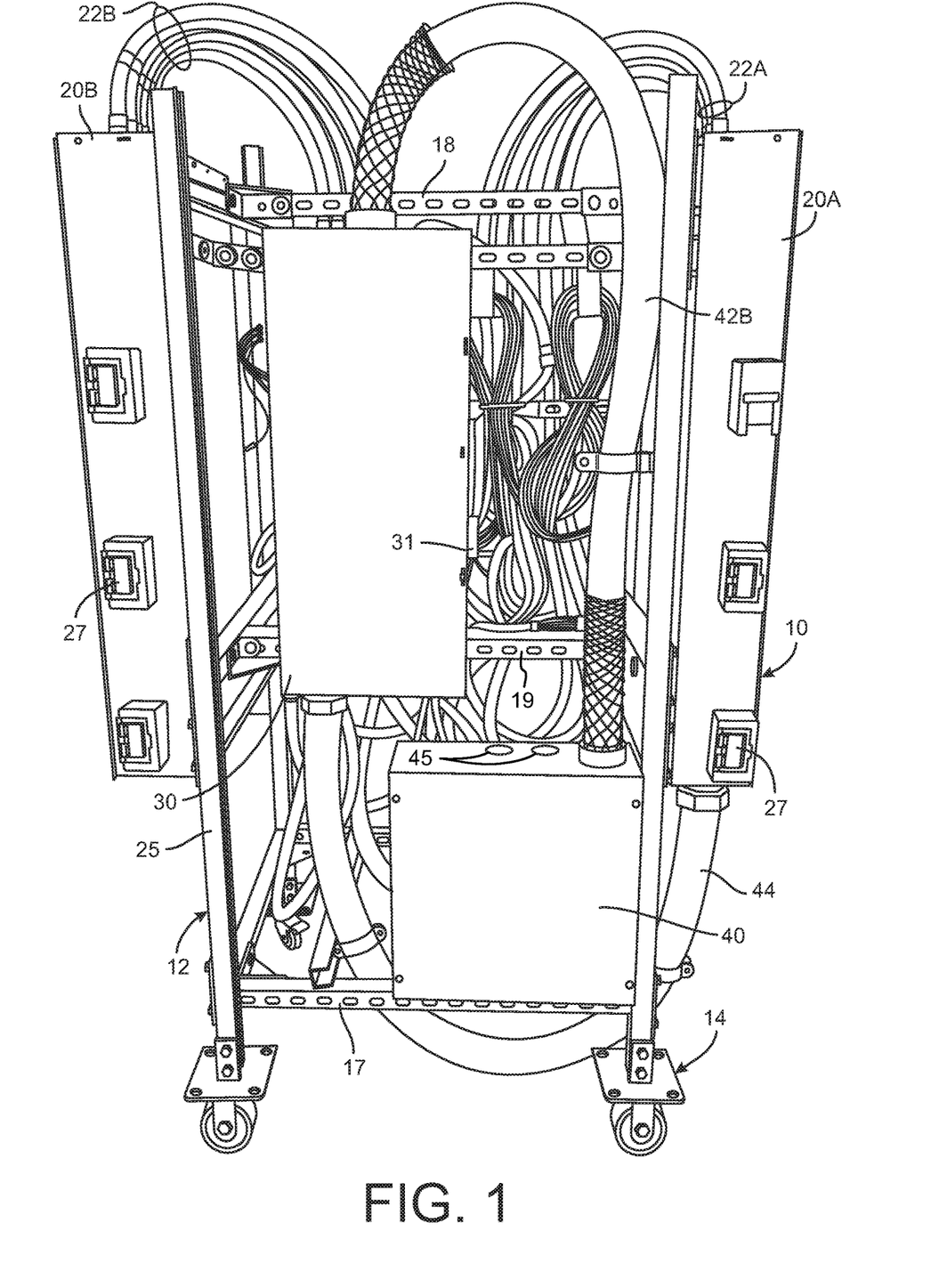
FIG. 1 is an end perspective view of a mobile power panel (MPP) according to one embodiment of the present disclosure.
Figure 2:
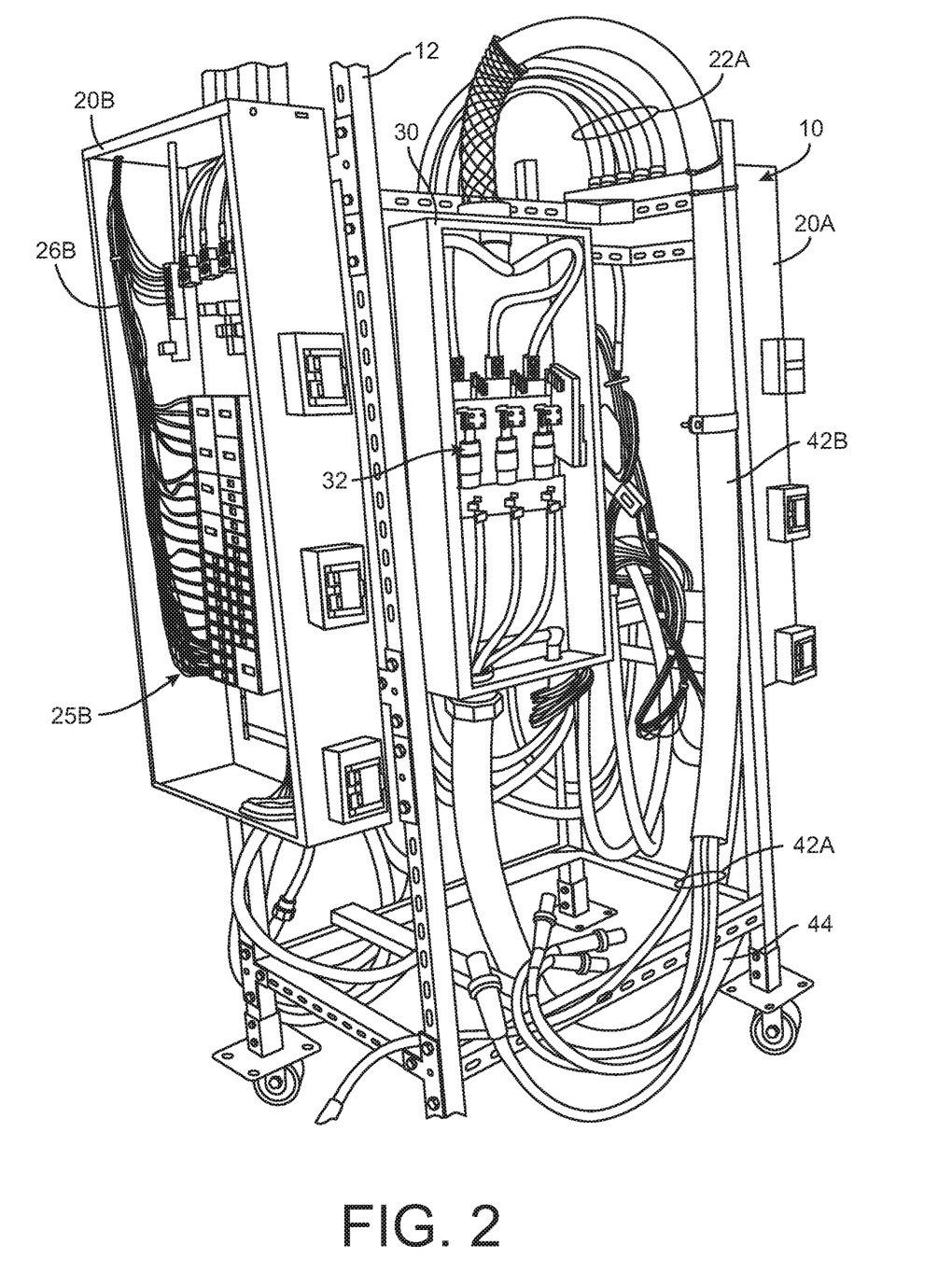
FIG. 2 is a side perspective view of the MPP shown in FIG. 1.
Figure 3:
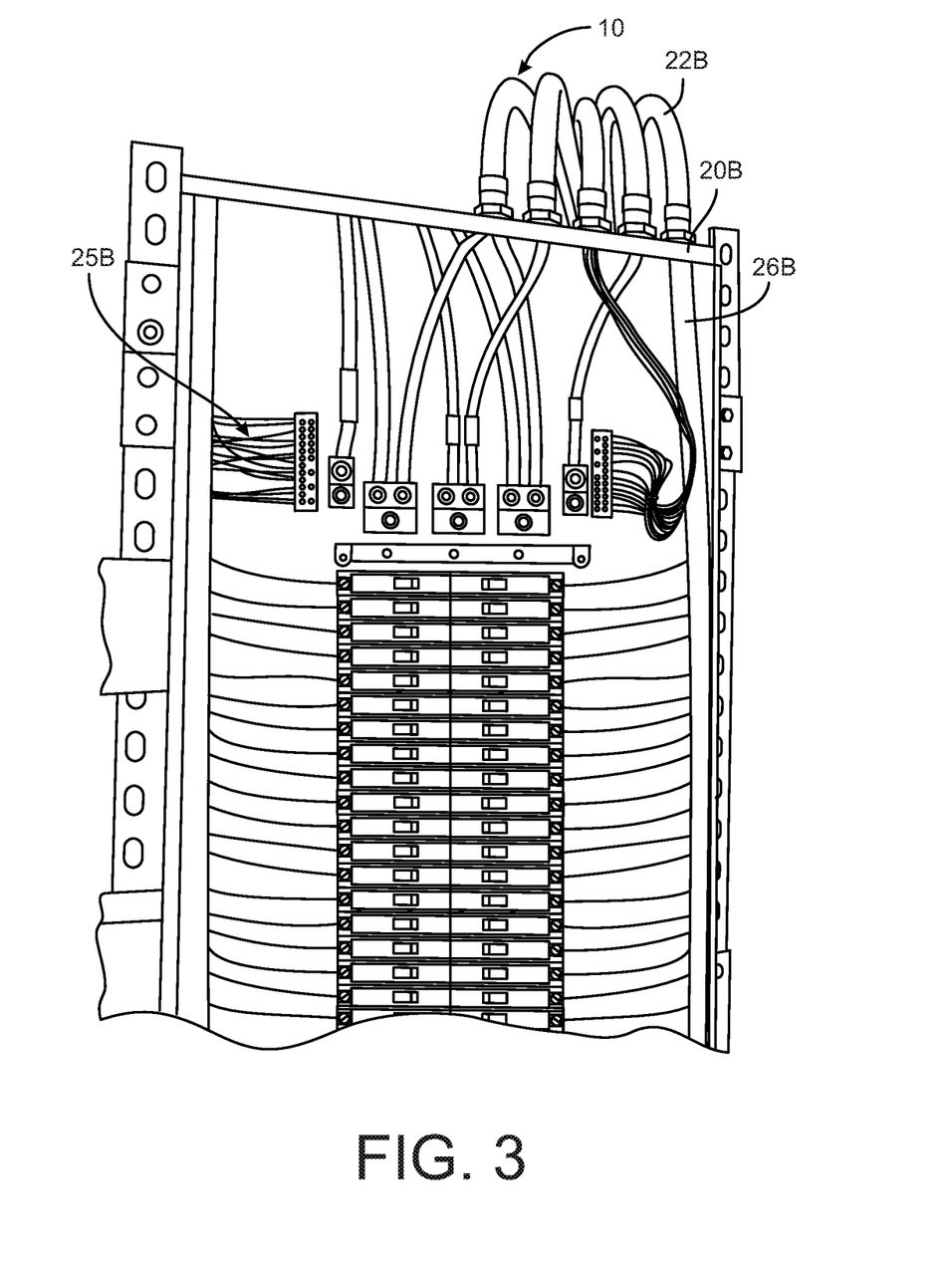
FIG. 3 is a detail perspective view of an electrical panel of the MPP shown in FIG. 1.
Figure 4:
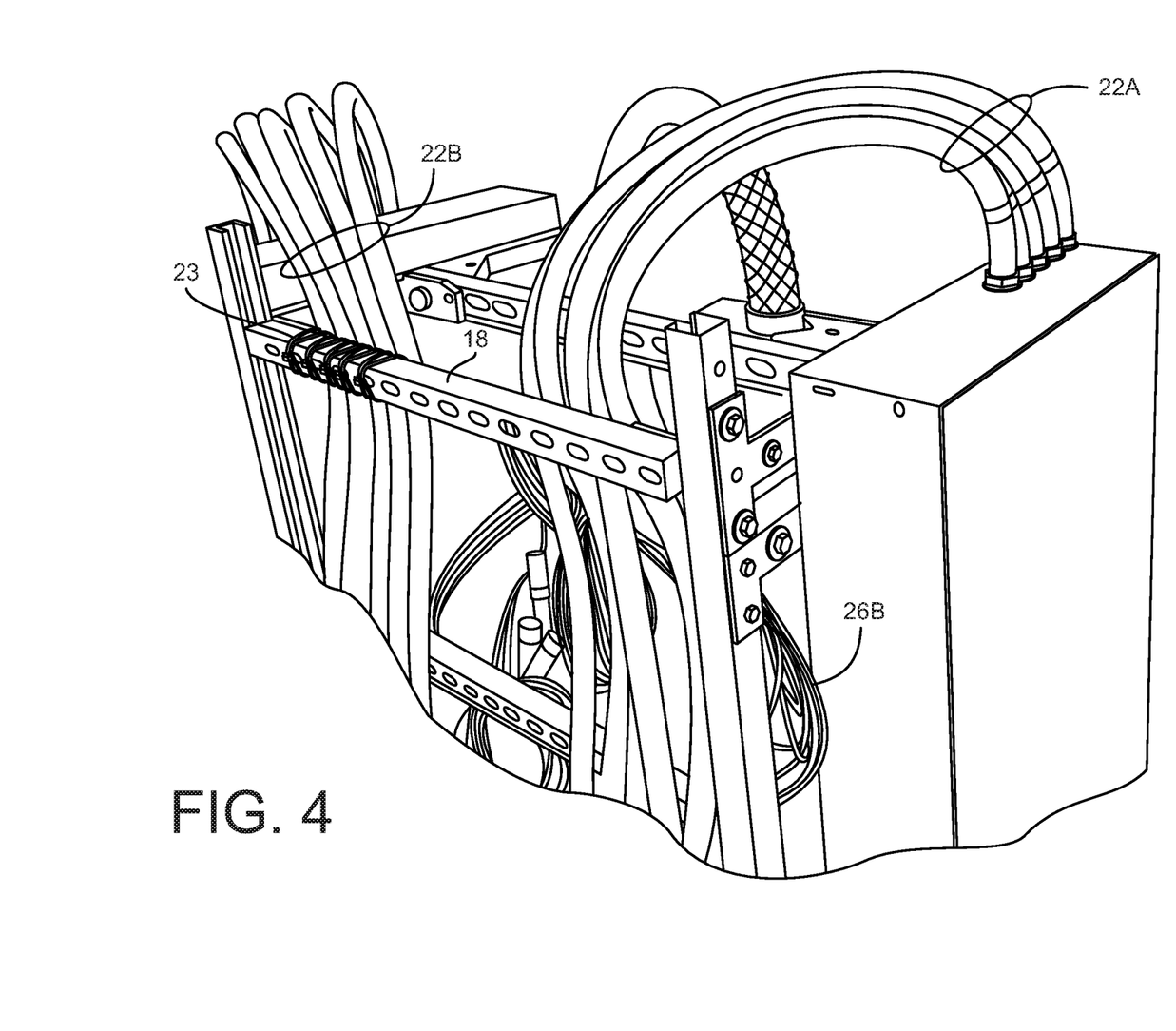
FIG. 4 is a top perspective view of the MPP shown in FIG. 1.
Figure 5:
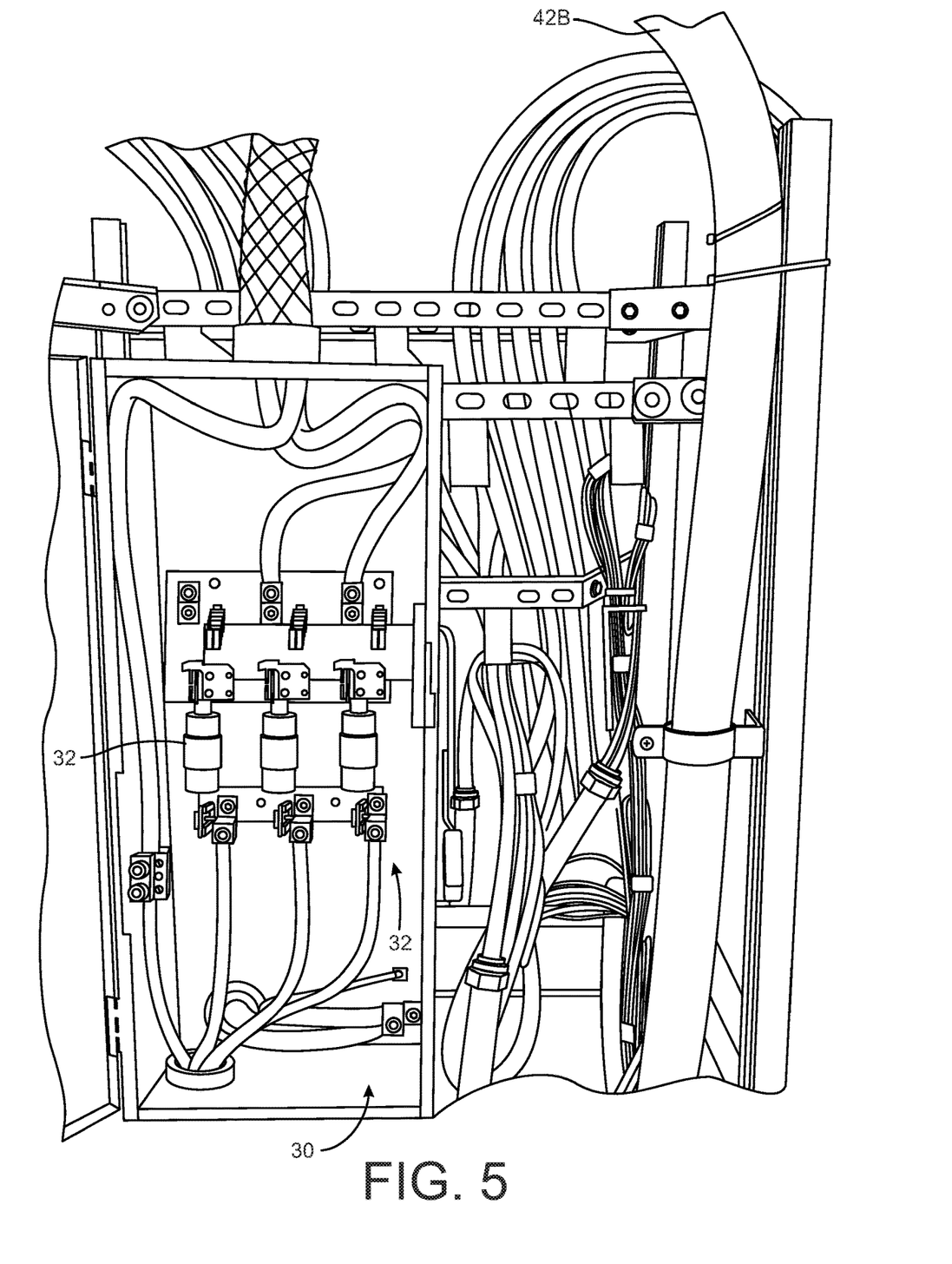
FIG. 5 is a detail perspective view of a safety switch box of the MPP shown in FIG. 1.

The heart of the MPP unit 10 are a pair of electrical panels 20A, 20B, mounted on opposite faces of the frame assembly 12, as shown in FIGS. 1-2. The panels each include a panel board including a plurality of circuit breakers, fuses and/or breaker clips, generally designated as electrical overload components 24 in FIG. 3. In one specific embodiment, the electrical overload components of the electrical panel 20A include 42 20-amp circuit breakers and 8 circuit breaker clips, while the electrical panel 20B can include a panel board 25B, shown in FIGS. 2-3, that includes 42 circuit breakers as electrical overload components. A wiring bundle 26A, 26B (FIGS. 2-3) includes wires connected to the electrical outputs of corresponding circuit breakers 24 of the respective panel boards in each of the electrical panels 20A, 20B. The wire bundle is fed through wire conduits 22A, 22B from the panels to the interior of the frame assembly 12 in one embodiment, as shown in FIGS. 1-5. The wire conduits can be connected to an upper horizontal element 18 (FIG. 1) by cable ties 23, as shown in FIG. 4. The wiring bundles 26A, 26B are connected to the existing building circuitry in the same manner that the wiring from the existing distribution panel is connected to that circuitry.

Figure 7:
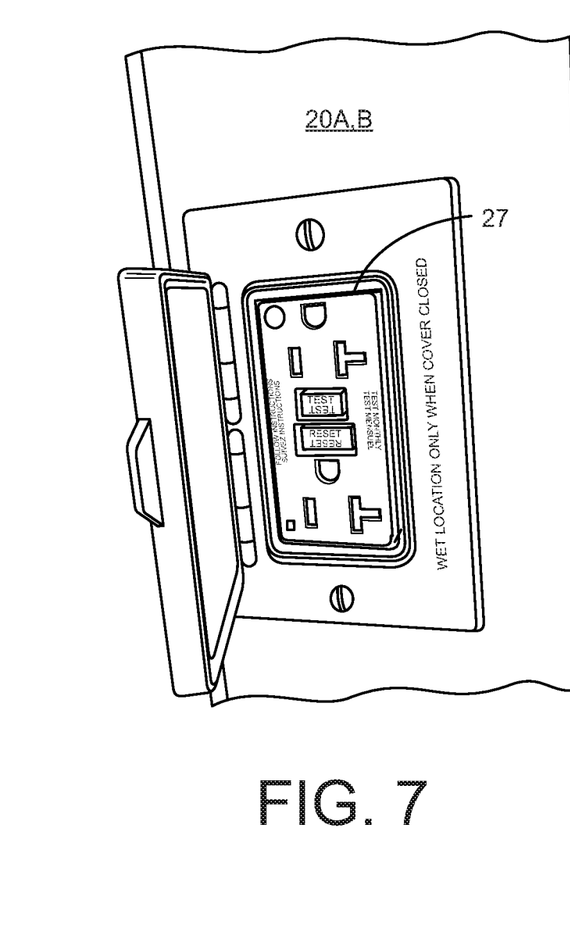
FIG. 7 is a detail view of an outlet component of the MPP shown in FIG. 1.
Figure 8:
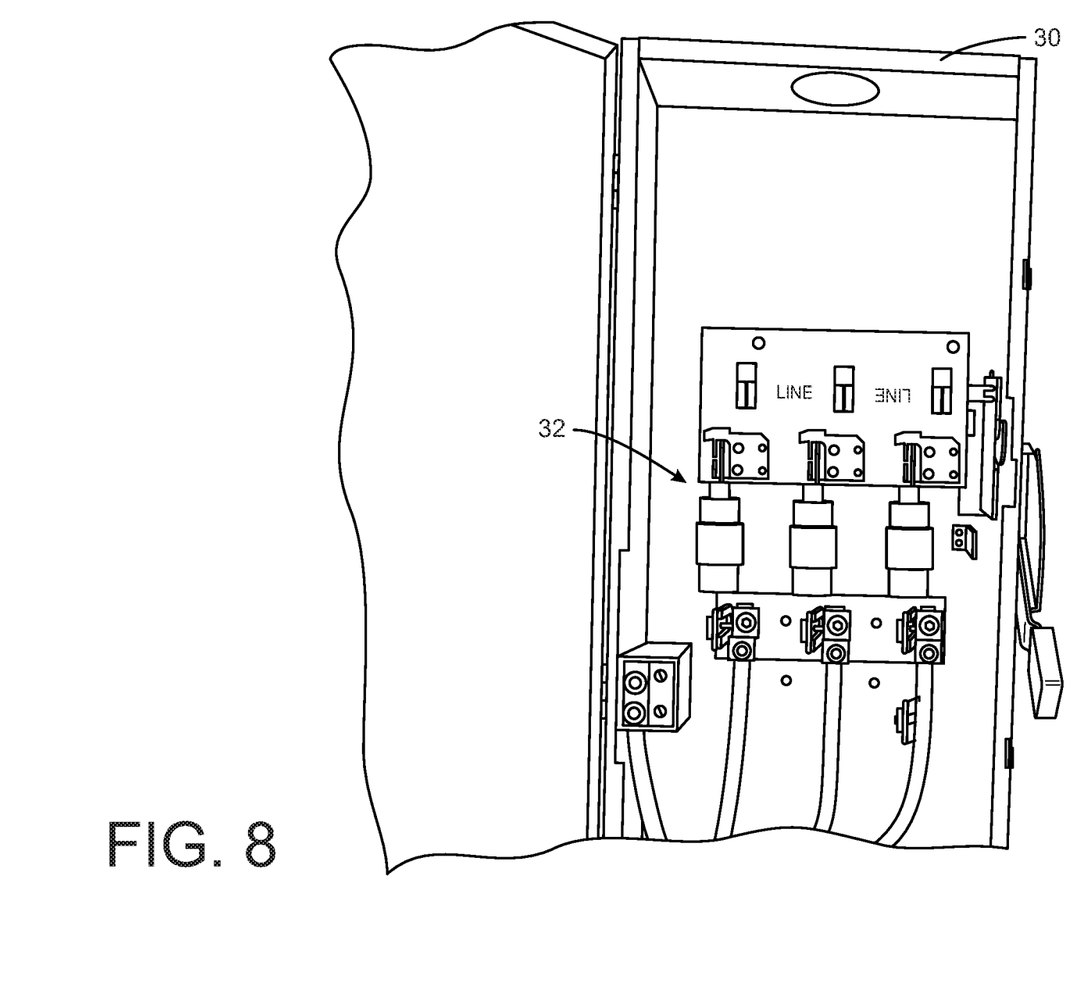
FIG. 8 is a detail view of the safety switch box of the MPP shown in FIG. 1.
Figure 9:
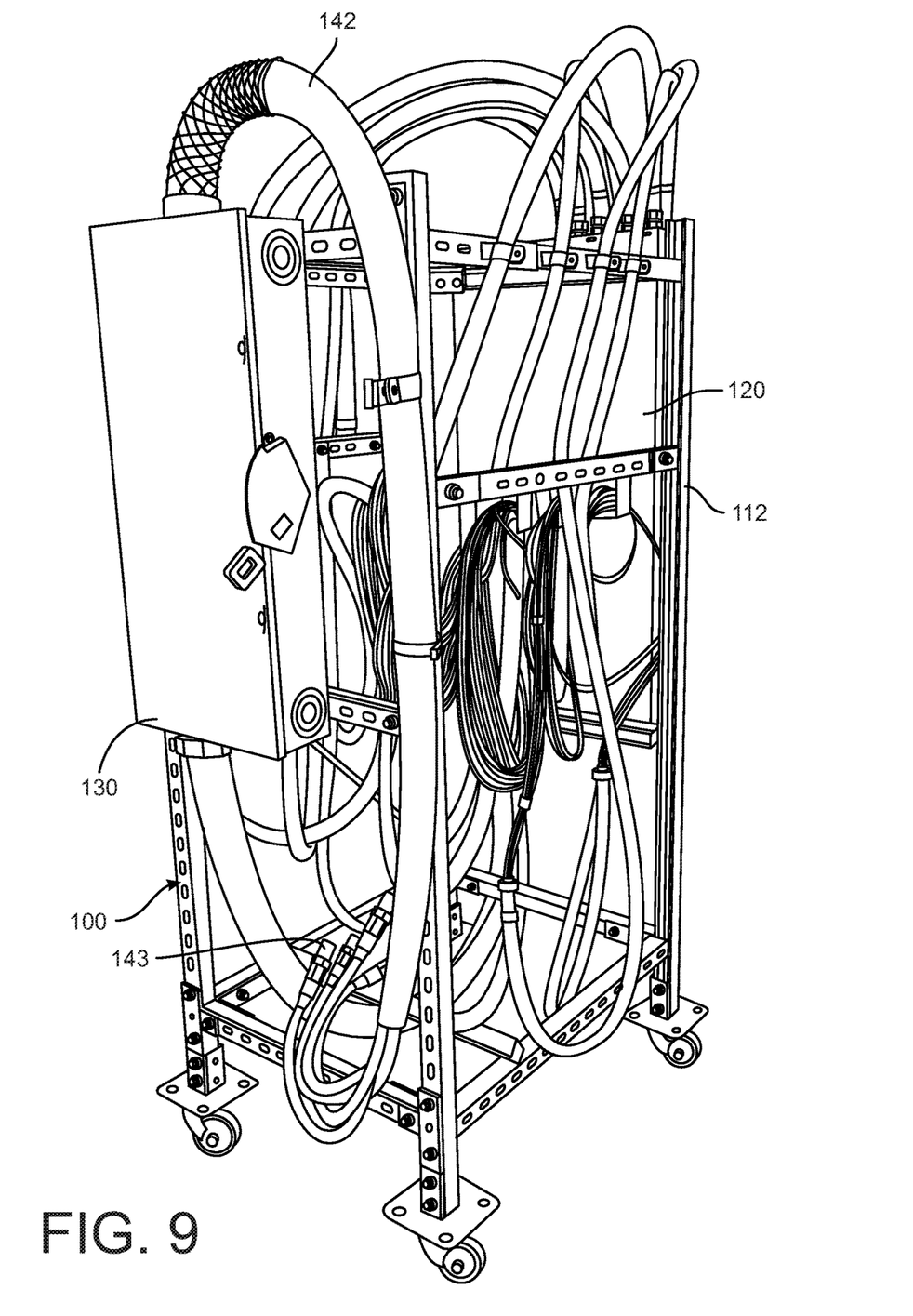
FIG. 9 is a perspective view of a mobile power panel (MPP) according to another embodiment of the present disclosure.

Each electrical panel 20A, 20B can include multiple power receptacles, such as the receptacles 27 shown in FIG. 1. The power receptacles can be standard three-prong ground-fault receptacles as shown in FIG. 7.

The electrical panels 20A, 20B are configured like conventional electrical panels in a building electrical system. Thus, in the specific embodiment described above, the electrical overload components are configured like the electrical overload components of the building electrical system. All of the electrical components are selected to meet state and federal building codes. With this configuration, the MPP can operate as a replacement or a substitute for the building electrical distribution panel or for the electrical panel of any of the multiple branch circuits throughout a building without compromising or altering the electrical current and voltage supplied to the building electrical wiring. Moreover, the components can be rated NEMA 3 to permit outdoor use in various weather conditions. The MPP 10 can thus be used to bypass an electrical panel that is on the outside of a building.

The MPP unit 10 further includes a safety switch box 30 fed from a junction box 40, as shown in FIGS. 1-2, 5, 8. The safety switch box 30 receives electrical power through a power cable 42A originating in the junction box 40. The power cable is fed through an insulating conduit 42B like the conduits 22A, 22B. The power cable 42A feeds a panel input cable bundle 44 through a fuse array 32, which can include 200 amp fuses in one specific example for industrial use. The switch box includes a master switch 31 that can be used to disconnect the electrical power between the power cables 42A and the panel input cables 44. In one embodiment, the wires of the panel input cable bundle 44 are connected to the electrical input of respective electrical overload components 24 of one of the panels, such as panel 20A, as shown in FIGS. 1-2. Input power can then be supplied to the other electrical panel 20B from the first panel 20A by a separate wire bundle connected between the two panels. Alternatively, the switch box can include an additional input cable bundle, similar to cables 44, which is connected to the inputs of the electrical overload components of the second electrical panel.

Figure 6:
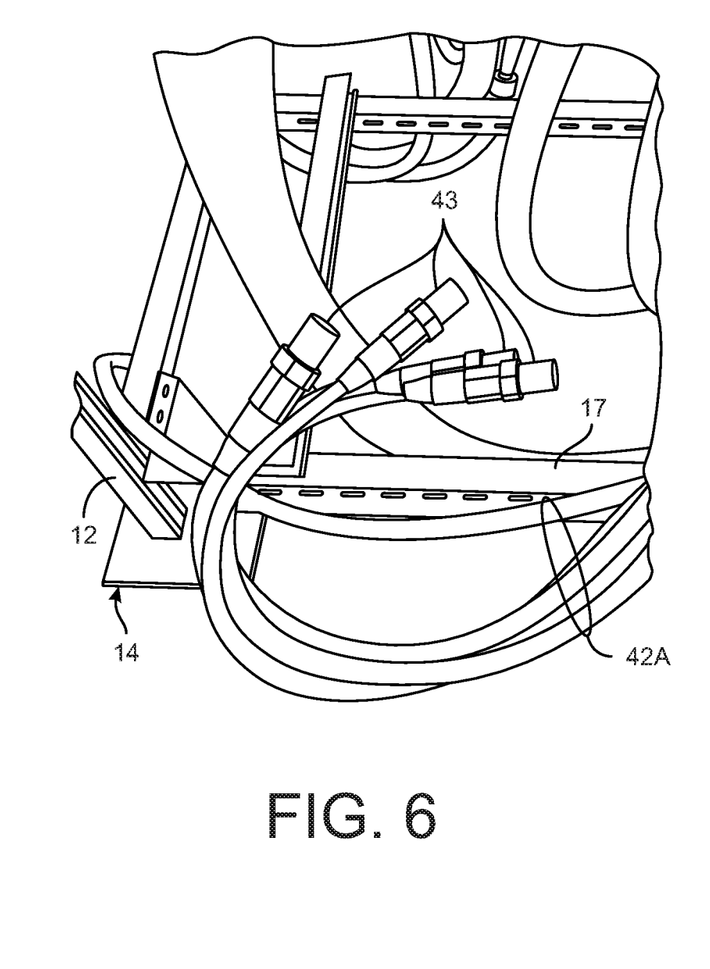
FIG. 6 is a detail view of the mating ends of wiring of the MPP shown in FIG. 1.

The junction box 40 provides the interface between the MPP unit 10 and the auxiliary external power supply. That power supply may be another transformer input for the building or an external source, such as an industrial generator. Thus, as shown in FIG. 6, the wires of the power cable 42A terminate in quick connect plugs 43 that are configured for secure and ready connection to mating plugs at the external or auxiliary electrical power supply. The quick connect plugs can be constructed as is known in the art to be able to quickly engage and disengage output cables of the power supply. Wires or a cable bundle from the power supply can be fed through openings 45 in the top of the junction box to be electrically connected to the quick connect plugs 43. Alternatively, the plug end of the wires of the power cable 42 can exit the junction box through the openings for mating with corresponding plugs of a transformer, generator or existing power feed. However, it is preferred that the electrical connection to the external source be contained within the junction box 40 for safety reasons.

Figure 10:
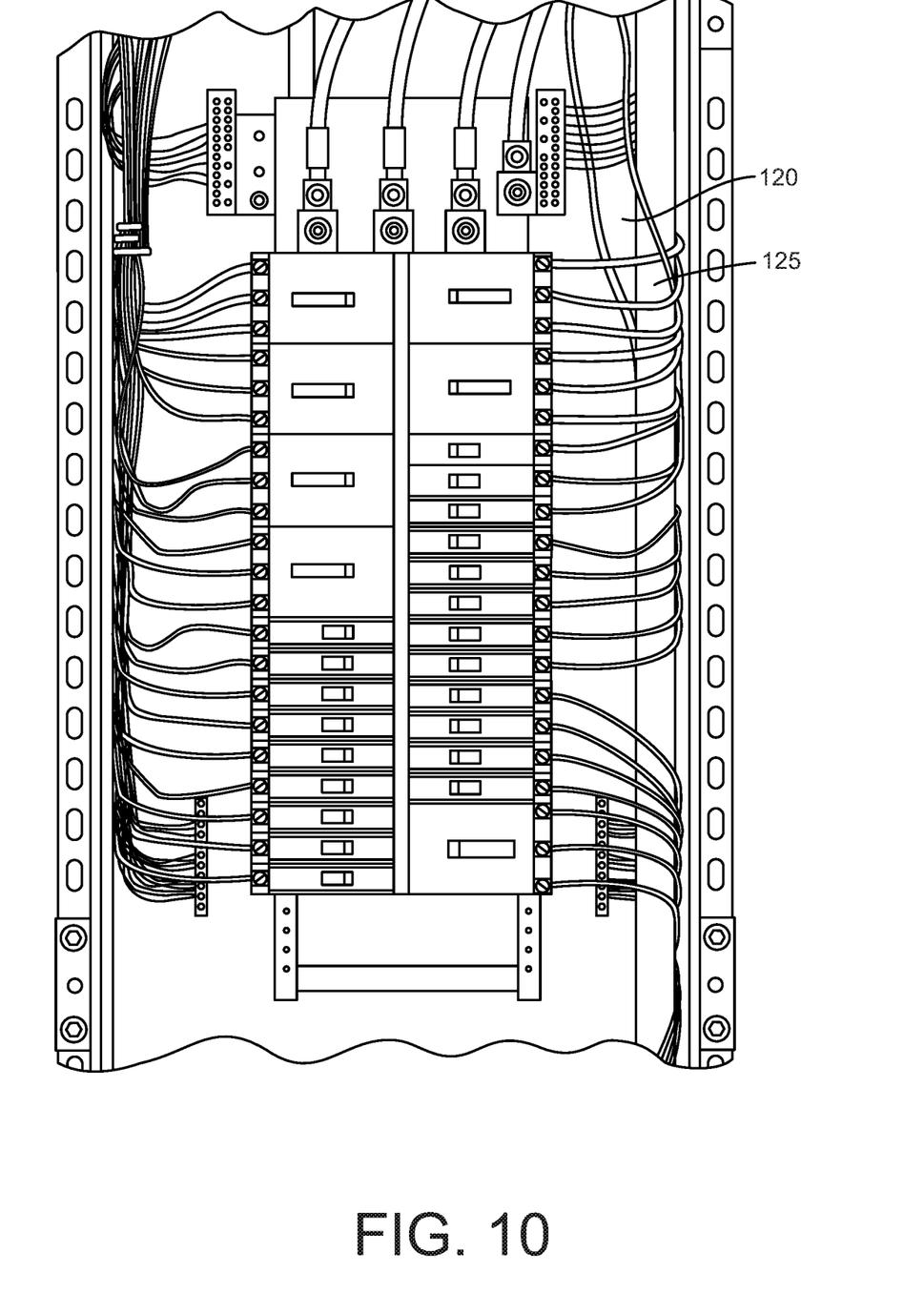
FIG. 10 is a detail view of an electrical panel of the MPP shown in FIG. 9.
Figure 11:
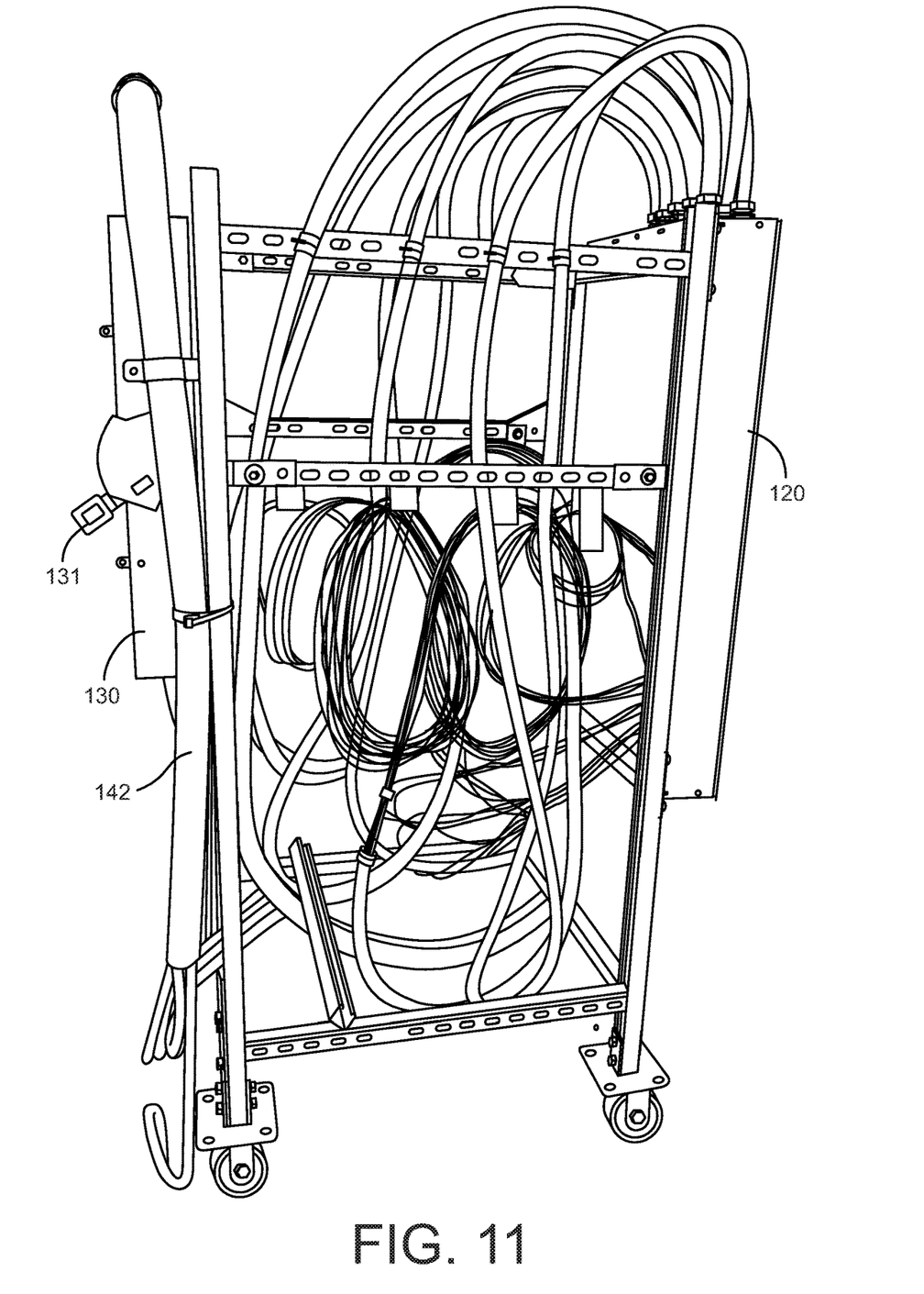
FIG. 11 is an end view of the MPP shown in FIG. 9.
Figure 12:
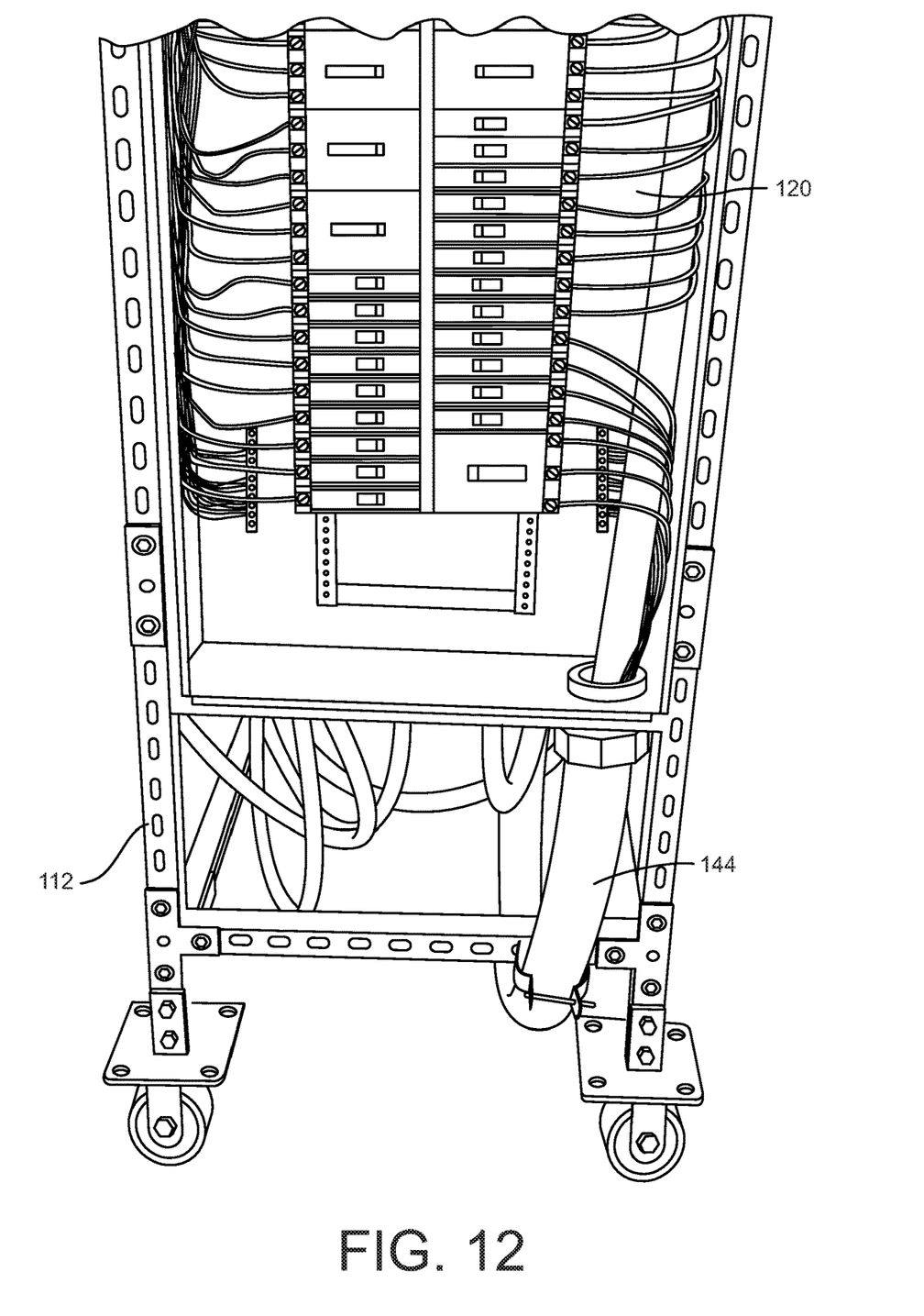
FIG. 12 is a side view of the MPP shown in FIG. 9.

The MPP unit 10 may be configured for low voltage applications, such as for use in a 225 amp, 120/208 volt 3-phase electrical system. An MPP unit 100 shown in FIGS. 9-12 includes a single high voltage electrical panel 120 and a safety switch box 130 which has a master on-off switch 131. The unit 100 does not include the junction box of the unit 10, but instead the power cable bundle 142 supplying power to the unit is fed directly to the safety switch box 130. The power cables 142 are provided with quick connect plugs 143, like the plugs 43, for quick and secure connection to the electrical power supply. The frame assembly 112 of the unit 100 is of similar construction as the frame assembly of the unit 10, although the dimensions of the assembly 112 can be smaller because it is carrying fewer electrical components. The electrical panel 120 can include a circuit breaker board 125 with an array of high voltage components, as shown in FIG. 10. In one specific embodiment, the electrical panel 120 can be configured for a standard small building, including four 30 amp 3-phase breakers, four 20 amp 3-phase breakers, two 20 amp 2-phase breakers and fourteen 20 amp single phase breakers. For comparison, the safety switch box 30 of the low voltage MPP unit 10 can include three 200 amp, 240 volt switches, while the safety switch box 130 of the high voltage MPP unit 100 can include three 200 amp, 600 volt, 3-phase fuses that are fusible at 125 amps.

In both MPP units 10, 100, the wire conduits can be ¾ in., 1 in. or 2½ in. liquid tight flex conduits. The conduits help protect and direct the wiring connected between the safety switch box, junction box and electrical panels.

Figure 13:
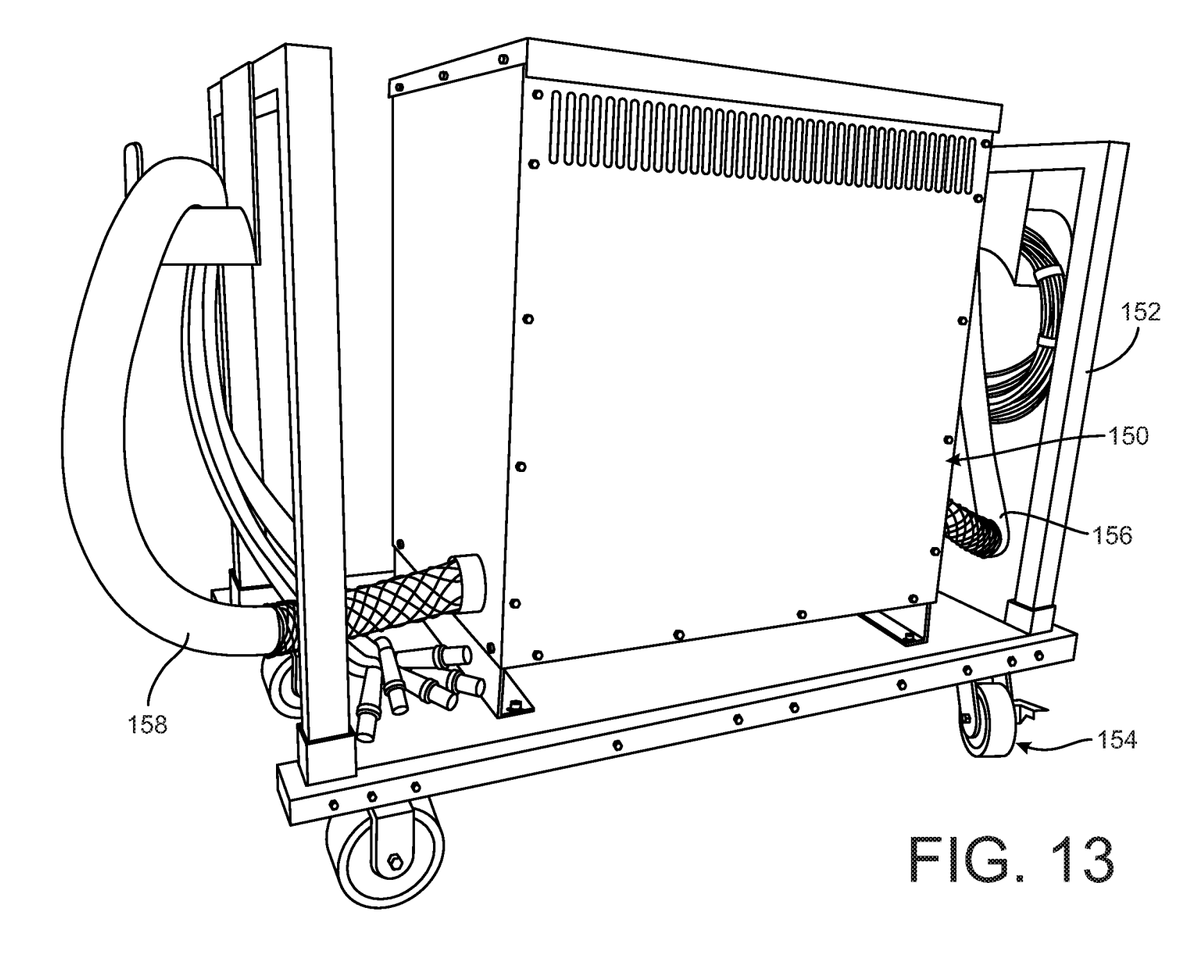
FIG. 13 is a perspective view of a mobile transformer for use with the MPPs of FIGS. 1 and 9.
Figure 14:
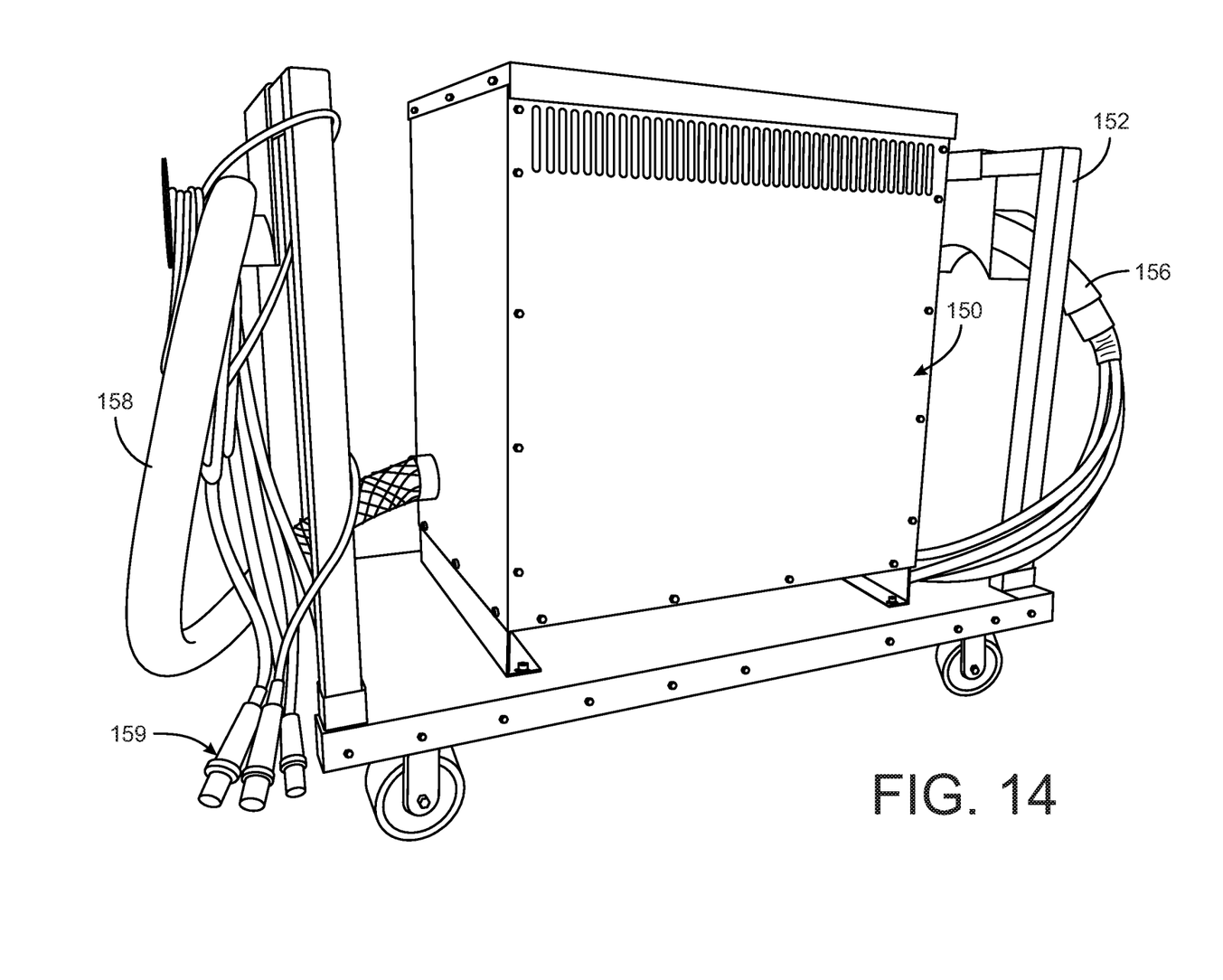
FIG. 14 is a perspective view of the mobile transformer shown in FIG. 13.

A portable transformer 150 can also be provided, as illustrated in FIGS. 13-14. The transformer 150 is carried on a mobile frame assembly 152 that includes lockable caster wheels 154. The transformer 150 can include a power input cable bundle 156 and an output cable bundle 158, with the wires in both bundles terminating in quick connect plugs 159. The power input cable bundle 156 is connected to the electrical power supply, such as the building input or an external or auxiliary power supply, while the output cable bundle 158 is connected to the power cable bundles 42, 142 of the particular MPP units 10, 100.

Figure 15:
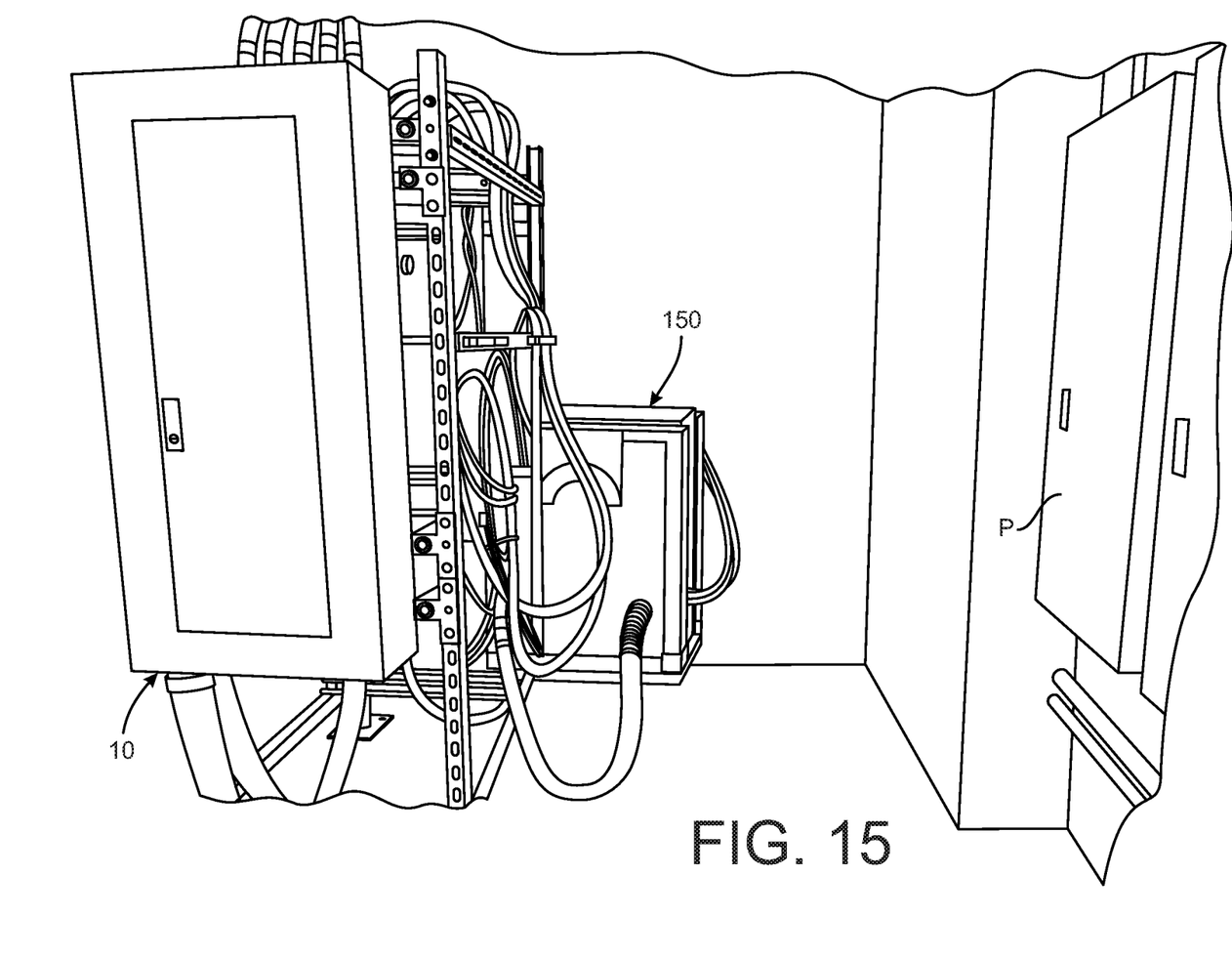
FIG. 15 is a depiction of an installation using an MPP and the mobile transformer disclosed herein.
Figure 16:
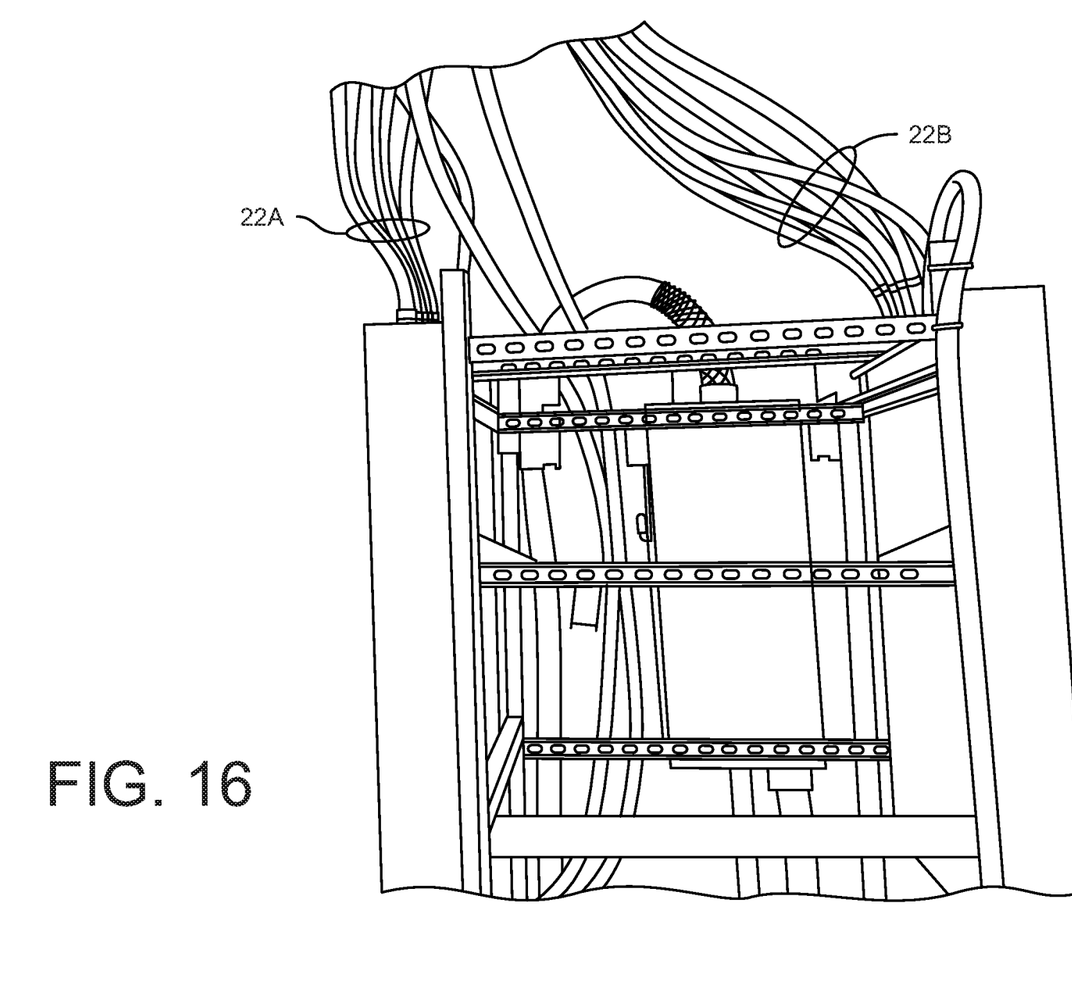
FIG. 16 is a depiction of another installation using an MPP of the present disclosure.

FIGS. 15-16 show exemplary installations using the MPP of the present disclosure. In one installation shown in FIG. 15, the low-voltage MPP unit 10 is connected to the transformer 150 and the transformer receives input voltage from an available power source, such as the building or an industrial generator. The existing building distribution panel P is shown with the wiring bundle for the building branch circuits disconnected from the distribution panel P and available for connection to the wiring bundle 26A and/or 26B of the MPP 10. In another installation shown in FIG. 16, the wire conduits 22A, 22B of the MPP unit 10 can be fed through available passages in the building to connect to existing electrical subsystems. In this configuration, the MPP unit can bypass an existing building electrical panel that is to be replaced or is non-functioning. The wire conduit 22A, 22B from the electrical panel 20, 120 can be fed through existing building passages to existing electrical subsystems.

It is understood that the MPPs 10, 100 of the present disclosure can be used to supply power to all or part of a building's electrical system from any electrical power supply. For instance, the MPPs can be used when an existing electrical distribution box is being serviced, in which case the MPP would be tied to the existing building power supply, or electrical input for a branch circuit. In the case of an emergency or natural disaster condition, the MPP can be connected to an external power source, such as a back-up generator for the building or an emergency generator that is brought to the building.

In the illustrated embodiments, the MPPs 10, 100 include wheels on the frame assemblies 12, 112 to make the MPPs mobile. However, the frame assemblies can be configured to be supported or mounted on a separate wheeled platform, or supported or mounted on a mobile platform, such as a pallet that can be moved by forklift.

The present disclosure should be considered as illustrative and not restrictive in character. It is understood that only certain embodiments have been presented and that all changes, modifications and further applications that come within the spirit of the disclosure are desired to be protected.

What is claimed is:

1. A mobile power apparatus for providing a temporary interface between an electrical power supply and an existing electrical system or subsystem of a building comprising:
   a frame assembly including a plurality of vertical and horizontal elements connected to form a support structure;
   at least one electrical panel mounted to the frame assembly and including a plurality of electrical overload components, each overload component having an electrical input and an electrical output;
   an output wire bundle including a plurality of wires electrically connected to the electrical output of corresponding ones of the plurality of electrical overload component and configured to be electrically connected to corresponding wires in the existing electrical system or subsystem of the building; and
   a safety switch box mounted to the frame assembly and including a fuse array having a plurality of fuses, the plurality of fuses electrically connected to the input of corresponding ones of the plurality of electrical overload components, and the plurality of fuses electrically connected to a power cable bundle configured for electrical connection to an output power cable of the electrical power supply.

2. The mobile power apparatus of claim 1, wherein the plurality of electrical overload components are selected from the group including electrical circuit breakers, fuses and breaker clips.

3. The mobile power apparatus of claim 1, wherein the power cable bundle connected to each of the plurality of fuses of the safety switch box includes a plurality of wires terminating in quick connect electrical connectors configured for electrical connection to wires of the output power cable of the electrical power supply.

4. The mobile power apparatus of claim 1, wherein the safety switch box includes a master on-off switch configured and operable to disconnect electrical power between the power cable bundle and the electrical inputs of the plurality of electrical overload components.

5. The mobile power apparatus of claim 1, wherein the at least one electrical panel includes an electrical panel configured for high voltage industrial/commercial usage.

6. The mobile power apparatus of claim 5, wherein the electrical panel includes three 200 amp, 600 volt, 3-phase fuses that are fusible at 125 amps.

7. The mobile power apparatus of claim 1, wherein the at least one electrical panel includes an electrical panel configured for low voltage industrial/commercial usage.

8. The mobile power apparatus of claim 7, wherein the electrical panel includes three 200 amp, 240 volt switches.

9. The mobile power apparatus of claim 1, wherein the at least one electrical panel includes an electrical panel including four 30 amp 3-phase breakers, four 20 amp 3-phase breakers, two 20 amp 2-phase breakers and fourteen 20 amp single phase breakers.

10. The mobile power apparatus of claim 1, wherein the at least one electrical panel includes an electrical panel including 42 20 amp circuit breakers and eight circuit breaker clips.

11. The mobile power apparatus of claim 1, wherein the at least one electrical panel includes at least one three-prong power receptacle.

12. The mobile power apparatus of claim 1, wherein the at least one electrical panel includes two electrical panels.

13. The mobile power apparatus of claim 12, wherein one of the two electrical panels includes 42 20 amp circuit breakers and eight circuit breaker clips, and the other of the two electrical panels includes 42 20 amp circuit breakers.

14. The mobile power apparatus of claim 1, further comprising an electrical transformer having an electrical output electrically connected to the power cable bundle of said safety switch box, and an electrical input configured for electrical connection to an output power cable of an electrical power supply.

15. The mobile power apparatus of claim 1, further comprising a plurality of wheel assemblies engaged to the frame assembly and configured for transporting the mobile power apparatus on a surface.

16. The mobile power apparatus of claim 15, wherein the plurality of wheel assemblies including lockable caster wheels.

\* \* \* \* \*